United States Patent [19]  [11] 4,264,363
Cech  [45] Apr. 28, 1981

[54] CORROSION INHIBITING COATING COMPOSITION

[75] Inventor: Leonard S. Cech, Wickliffe, Ohio

[73] Assignee: The Lubrizol Corporation, Wickliffe, Ohio

[21] Appl. No.: 54,747

[22] Filed: Jul. 5, 1979

[51] Int. Cl.³ .............................................. C09D 5/08
[52] U.S. Cl. .............................. 106/14.28; 106/14.29; 106/14.36; 106/14.38; 106/14.43; 252/32.5; 252/33.2; 252/39; 252/389 A; 252/395; 252/396; 260/33.6 PQ; 428/470
[58] Field of Search .............. 106/14.28, 14.29, 14.36, 106/14.38, 14.43, 14.44; 252/32.5, 33.2, 39, 389 A, 395, 396; 260/33.6 PQ; 428/470

[56] References Cited

U.S. PATENT DOCUMENTS

| | | | |
|---|---|---|---|
| 2,005,619 | 6/1935 | Graves | 260/963 |
| 2,341,565 | 2/1944 | Lyman et al. | 260/963 |
| 2,360,302 | 10/1944 | Etzler et al. | 260/963 |
| 2,698,835 | 1/1955 | Otto | 252/49.8 |
| 3,027,325 | 3/1962 | McMillen et al. | 252/33 |
| 3,050,487 | 8/1962 | Solomon | 260/964 |
| 3,055,865 | 9/1962 | Craig | 260/920 |
| 3,242,079 | 3/1966 | McMillen | 252/33 |
| 3,254,111 | 5/1966 | Hawkins et al. | 526/298 |
| 3,312,618 | 4/1967 | Le Suer et al. | 252/33 |
| 3,350,308 | 10/1967 | McMillen | 252/33 |
| 3,372,114 | 3/1968 | Rense | 106/14.28 |
| 3,372,115 | 3/1968 | McMillen | 252/33 |
| 3,376,222 | 4/1968 | McMillen | 252/33 |
| 3,377,283 | 4/1968 | McMillen | 106/14.29 |
| 3,384,586 | 5/1968 | McMillen | 252/33 |
| 3,411,923 | 11/1968 | Bretz | 106/14.43 |
| 3,422,013 | 1/1969 | Scher | 106/14.29 |
| 3,453,124 | 7/1969 | Wurstner | 106/14.28 |
| 3,471,403 | 10/1969 | Le Suer et al. | 252/39 |
| 3,488,284 | 1/1970 | Le Suer et al. | 252/33 |
| 3,595,790 | 7/1971 | Norman et al. | 252/33 |
| 3,671,012 | 6/1972 | Scott et al. | 252/33 |
| 3,746,643 | 7/1973 | Rogers | 252/33 |
| 3,766,066 | 10/1973 | McMillen | 260/38 |
| 4,161,566 | 7/1979 | Higgins | 106/14.28 |

FOREIGN PATENT DOCUMENTS 1239860  7/1971  United Kingdom.

Primary Examiner—Lorenzo B. Hayes
Attorney, Agent, or Firm—Daniel N. Hall; William H. Pittman; Raymond F. Keller

[57] ABSTRACT

Corrosion inhibiting coating compositions are prepared comprising combining a mixture (I) of (A) a non-Newtonian colloidal disperse system comprising an alkali or alkaline earth metal carbonate predispersed in a dispersing medium in the presence of at least one organic alkali or alkaline earth salt of a carboxylic or sulfonic acid and (B) an acidic ester of a phosphoric acid with (II) a hydrocarbon resin which is substantially insoluble in said mixture (I) at temperatures below about 60° C. The ester is typically a mono- or diester such as that from reaction of an alcohol and/or alkyl-substituted phenol and phosphorus pentoxide.

9 Claims, No Drawings

CORROSION INHIBITING COATING COMPOSITION

This invention relates to novel coating composition which inhibit corrosion of metal surfaces to which they are applied.

The corrosion of metal surfaces is of obvious economic significance in many industrial applications and as a consequence the prevention of such corrosion is a matter of prime consideration. Both ferrous and nonferrous metals are subject to corrosion and there has been a continuing and unending search for compositions which are to be useful in inhibiting corrosion. Such coatings should adhere tightly to the surface, resist flaking, crazing, blistering, powdering and other forms of adhesion loss, and exhibit resistance to weathering humidity and corrosive atmosphere such as salt laden mists and fogs.

One such material that has been found useful in the past is disclosed in U.S. Pat. No. 3,453,124. This material comprises the combination of a non-Newtonian colloidal disperse system such as used in the coatings of this invention with an acidic ester of a phosphoric acid. The use of such combinations with hydrocarbon resins also described. Such resins, however, are said to be miscible with the combination and soluble in any solvent used to prepare the composition. In contrast, the hydrocarbon resins used in the coatings of this invention are not soluble in the mixture in the absence of volatile diluents. U.S. Pat. No. 3,746,643 and U.K. Pat. No. 1,239,860 describe combinations of colloidal dispersion systems and certain waxes.

In its broadest aspect, this invention is directed to a coating composition for protecting metal from corrosion comprising (I) a mixture made by the process which comprises mixing at a temperature within the range of from about 25° C. up to the decomposition temperature of (A) or (B):
  (A) from about 5 to about 10 parts by weight of a non-Newtonian colloidal disperse system comprising
    (1) solid, metal-containing colloidal particles selected from the class consisting of alkali and alkaline earth metal carbonate predispersed in
    (2) a dispersing medium, and,
    (3) as an essential third component, at least one organic compound which is soluble in said disperse medium, consisting of an alkaline earth metal salt of an acid selected from the class consisting of oil-soluble carboxylic and sulfonic acids with
  (B) from about 0.5 to about 5 parts by weight of an acidic ester of a phosphoric acid wherein the alcoholic portions of said acidic ester are selected from the class consisting of hydrocarbyloxy and hydroxy-substituted hydrocarbyloxy compounds, and wherein said solid metal-containing colloidal particles and said third component, in combination constitute from 10% to about 70% by weight of the disperse system and (II) a hydrocarbon resin which is substantially insoluble in said mixture (I) at temperatures below about 60° C. Maintenance coatings for metals comprising this composition as well as articles of manufacture at least a part of whose surface is coated with this composition are also within the scope of the invention.

The non-Newtonian colloidal disperse systems used in the compositions of this invention are well known to the art and are described, for example, in U.S. Pat. Nos. 3,492,231, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,384,586. These patents are incorporated by reference for their disclosures relating to the nature and methods of preparing non-Newtonian colloidal disperse systems useful in the present invention. These systems are gel-like in appearance and are sometimes called greases.

In these disperse systems at least a portion of the particles dispersed therein are solid metal-containing particles formed in situ. The size of these particles is not critical as long as they are dispersed in the form, for example, of colloids or colloidal solutions. Ordinarily, the particles do not exceed 5000 angstroms in size. Generally, the maximum unit particle size is less than about 1000 angstroms, usually less than 400 angstroms. Disperse systems having unit particle size in the range of 30 angstroms to 200 angstroms has been found to give excellent results. The term "unit particle size" is defined in the above-noted U.S. Pat. No. 3,384,586 patent which is incorporated herein by reference for this definition.

The solid metal-containing particles are metal salts of inorganic acids and low molecular weight organic acids (such as formic, acetic and propionic acids), hydrates thereof, or mixtures of two or more of these. These salts are usually alkali and alkaline earth formates, acetates, carbonates, hydrogen carbonates, hydrogen sulfides, sulfides, sulfates, hydrogen sulfates and halides. Magnesium, calcium and barium salts are typical examples. Typically then the metal particles are solid metal-containing colloidal particles consisting essentially of alkaline earth metal salts, these salts being further characterized by having been formed in situ.

Colloidal disperse systems used in the agents of this invention also comprise at least one liquid dispersing medium. The identity of the medium is not a critical aspect of the invention as the medium serves primarily as a liquid vehicle in which the solid particles are dispersed. Normally it consists of one or more substantially inert, non-polar organic liquids. That is, liquids which are substantially chemically inactive in the particular environment in question. The liquid dispersing medium may be substantially volatile or non-volatile at standard temperature and pressure. Often the non-Newtonian disperse system is prepared in such a manner that a mixture of such volatile and non-volatile organic liquids is used as the dispersing medium thus permitting easy removal of all or a portion of the volatile component by heating. This is an optional and often desirable means for controlling the viscosity or fluidity of the disperse system.

From the standpoint of availability, cost and performance, liquid hydrocarbons and particularly liquid petroleum fractions represent particularly useful disperse mediums. Included within these classes are benzene and alkylated benzene, paraffin-based petroleum fractions, petroleum ether, petroleum naphthas, mineral oil, Stoddard solvent (i.e., mineral spirits) and mixtures thereof. Typically the disperse medium is mineral oil or at least about 25% of the total medium is mineral oil. Often at least about 50% of the dispersing medium is mineral oil.

As noted, mineral oil can serve as the exclusive dispersing medium.

In addition to the solid metal-containing particles and the dispersing medium, the non-Newtonian colloidal disperse system of this invention includes at least one organic compound which is soluble in the disperse medium and whose molecules are characterized by the presence of a hydrophobic portion and at least one polar substituent. While the types of suitable organic compounds are extremely diverse and include generally oil-soluble organic acids such as phosphorus acids, thiophosphorus acids, sulfur acids, carboxylic acids, thiocarboxylic acids and the like, as well as their corresponding alkali and alkaline earth salts, the alkaline earth and alkali metal salts of oil-soluble petrosulfonic acids, mono-, di- and tri-aliphatic hydrocarbon sulfonic acids and oil-soluble fatty acids, are, for reasons of economy, availability and performance particularly suitable. Polypropylene-substituted benzene sulfonic acids of molecular weights 500-700 and petroleum derived polyisobutylene-benzene sulfonic acids and mixtures thereof can be used. While the practice and description of this invention does not depend on any particular theory, it is believed that at least a portion of the organic compounds orient themselves along the external surface of the colloidal particles and thereby form micellar colloidal particles characterized by at least one metal-containing layer, at least one hydrophobic layer, and a polar layer bridging said metal-containing layer and said hydrophobic layer.

Broadly speaking, the non-Newtonian colloidal disperse systems used in the present invention are prepared by treating a single phase homogeneous Newtonian system of an overbased organic compound corresponding to one or more of the organic compounds described hereinabove with a conversion agent which is usually an active hydrogen-containing compound.

Typical active hydrogen-containing conversion agents include lower aliphatic carboxylic acids, water, aliphatic alcohols, alicyclic alcohols, phenols, ketones, aldehydes, amines, boron acids, and phosphorus acids. Oxygen, air and carbon dioxide can also be used as conversion agents. Often a mixture of water and alcohols (e.g., a lower alkanol) is used. Such mixtures usually have weight ratios of alcohol to water of from about 0.05:1 to about 24:1.

The treating operation is simply a thorough mixing together of the two components, i.e., homogenization. This homogenization is generally achieved by vigorous agitation of the components at or near the reflux temperature of the mixture. Usually this temperature ranges from about 25°-200° C., typically it is no more than about 150° C. This treatment converts these single phase systems into non-Newtonian colloidal disperse systems. Suitable overbased materials are well known to the art and are disclosed in a large number of U.S. patents. Representative examples of these patents are disclosed in column 8 of the afore-mentioned U.S. Pat. No. 3,384,586 and this disclosure is hereby incorporated by reference. Further details as to the preparation of the non-Newtonian colloidal disperse systems are found in the above-noted U.S. Pat. Nos. 3,384,586, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,492,231 which are hereby incorporated by reference for their disclosures relating to the preparation of non-Newtonian colloidal disperse systems.

The acidic esters of phosphoric acids used in this invention are derived from phosphorus reactants such as phosphorus pentoxide, phosphorus oxychloride, phosphoric acids, polyphosphoric acids, etc., and an alcoholic and/or phenolic compound of the type ROH. The term "acidic ester" refers to esters having at least one acid hydrogen atom attached through an oxygen (i.e., H—O) to phosphorus. Thus, the "acidic esters" are mono- or diesters of phosphoric acids. The preparation of these materials is described in detail in U.S. Pat. No. 3,453,124 which is hereby incorporated by reference for its disclosures in this regard.

The alcoholic and phenolic compounds used to prepare the acidic esters are selected from the mono- and polyhydric aliphatic alcohols, alicyclic alcohols, aliphatic substituted phenols, and mixtures of these including mixtures of one type of alcohol, and mixtures of various types.

Accordingly, in the compound ROH, R is an aliphatic, alicyclic, aryl or aliphatic-substituted aryl radical. Preferably, these are hydrocarbon or hydroxy-substituted hydrocarbon radicals. Thus, the alcoholic portion of the acidic esters, i.e., —OR, is the oxy radical resulting from removal of the hydroxyl hydrogen. Normally the alcoholic portion will by hydrocarbyloxy or hydroxy-substituted hydrocarbyloxy.

The alcohols and phenols contain up to about forty carbons although, in the case of polymeric alcohols and substituted phenols molecular weights of up to about 10,000 are acceptable. Members of the group ROH include the mono- and polyhydric alkanols and alkenols containing up to about ten hydroxy groups, perferably having up to thirty carbons; mono- and polyhydric alicyclic alcohols. ROH can also be a phenol, naphthol, aliphatic hydrocarbon-substituted phenol or naphthol wherein the aliphatic substituent can be alkyl, alkenyl, or olefin polymer substituent, etc. In addition to the hydroxy groups present in these alcohols and phenols, other substituents such as ether linkages (—O—), lower alkoxy, alkyl mercapto, halo,

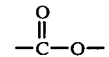

nitro, etc., may be present so long as they do not interfere with the formation of the acidic phosphorus esters, or its performance.

Representative phenolic compounds of the formula ROH are phenol, 2-chlorophenol, beta-naphthols, alpha-naphthols, cresol, resorcinol, catechol, polyisobutene (molecular weight—1000) substituted phenol, polypropylene (molecular weight—1500) substituted phenol, 4-cyclohexylphenol, etc. Aliphatic hydrocarbon substituted phenols characterized by a molecular weight of up to about 100,000 and preferably up to about 5000 having from one to three aliphatic hydrocarbon substituents constitute a preferred class of phenolic compounds.

The sources of the ROH substitutent include the substantially saturated polymers of mono-olefins having from 2 to about 8 carbon atoms. The especially useful polymers are the polymers of 1-mono-olefins such as ethylene, propene, 1-butene, isobutene, and 1-hexane. Polymers of medial olefins, i.e., olefins in which the olefinic linkage is not at the terminal position, likewise are useful. They are illustrated by 2-butene, 3-pentene, and 4-octene.

Also useful as substituents are the interpolymers of the olefins such as those illustrated above with other interpolymerizable olefinic substances. Such interpolymers include, for example, those prepared by polymerizing isobutene with butadiene; propene with isoprene; ethylene with piperylene; isobutene with chloroprene; 1-hexene with 1,3-hexadiene; 1-octene with 1-hexene; 1-heptene with 1-pentene; 3-methyl-1-butene with 1-octene; 3,3-dimethyl-1-pentene with 1-hexene; etc.

The aliphatic hydrocarbon-substituted phenols may be the mono- or the poly-substituted phenols, i.e., phenols having two or more substituents. The preparation of the high molecular weight substituted phenols by alkylation of phenol with the olefin polymer in the presence of a Friedel-Crafts catalyst such as boron fluoride, and aluminum chloride, is well known.

Other suitable alcohols of the formula ROH include methanol, ethanol, isooctanol, dodecanol, cyclohexanol, cyclopentanol, behenyl alcohol, hexatriacontanol, neopentyl alcohol, isobutyl alcohol, benzyl alcohol, betaphenylethyl alcohol, 2-methylcyclohexanol, beta-chloroethanol, mono-methyl ether of tetraethylene glycol, etc.

Various processes for producing acidic esters of phosphoric acids are well known in the art. Suitable acidic esters and/or processes for their preparation are disclosed in U.S. Pat. Nos. 2,005,619; 2,341,565; 2,360,302; 2,698,835; 3,050,487 and 3,055,865. Acidic esters can be prepared according to the process disclosed in U.S. Pat. No. 3,254,111 by eliminating the neutralization step employed therein. The patents are all hereby incorporated by reference for their disclosures relating to acidic esters.

Thus, the acidic phosphorus-containing esters useful in the preparation of the compositions of this invention can be prepared by the reaction of a phenolic composition with phosphorus pentoxide. Phosphoric acid (i.e., hydrated phosphorus pentoxide) may be used in lieu of the pentoxide. The molar ratio of the phenolic to the phosphorus pentoxide should be within the range of from about 1:1 to 10:1, the preferred ratio being from 2:1 to 4:1. The reaction is effected simply by mixing the two reactants at a temperature between about 50° C. to 200° C. or higher, but ordinarily it is below 100° C. The reaction is preferably carried out in the presence of a solvent which facilitates temperature control and mixing of the reactants. The solvent may be any inert fluid substance in which either one or both reactants are soluble, or the product is soluble. Examples of such solvents include aryl hydrocarbons such as benzene, toluene, or xylene; aliphatic hydrocarbons such as n-hexane, cyclohexane, or naphtha; or polar solvents such as diethyl ether, carbitol, dibutyl ether, dioxane, chlorobenzene, nitrobenzene carbon tetrachloride or chloroform.

The product of the above reaction is acidic and is a mixture of acidic phosphates consisting predominantly of the mono- and the di-esters of phosphoric acids, the ester radical (i.e., alcoholic portion, —OR) being derived from the hydroxy compound, ROH.

Another preferred class of acidic phosphorus-containing esters can be obtained by the reaction of phosphorus pentoxide or a phosphoric acid with a mixture of an aliphatic hydrocarbon substituted phenol and a copolymer of allyl alcohol and a styrene. The reaction mechanism by which the acidic ester product is formed is not completely understood but probably involves a reaction between the phosphorus pentoxide and the copolymer of allyl alcohol and a styrene, followed by the reaction of this intermediate product with the substituted phenol. The optimum reaction time is about 4 to 6 hours although a suitable product can be obtained at any point within a period of from about 1 to 10 hours.

The copolymer of allyl alcohol and a styrene preferably is a low molecular weight copolymer prepared from an approximately equimolar mixture of the two monomers. The molecular weight of the copolymer should be within the range of from about 500 to about 5000. Copolymers made from approximately equimolar amounts of allyl alcohol and styrene having a molecular weight of about 1100 to 2000 are typically used.

The term "a styrene" as used herein refers to styrene or any of the various substituted styrenes such as halogen-substituted styrenes, hydrocarbon-substituted styrenes, alkoxy-styrenes, acyloxy-styrenes, nitro-styrenes, etc. Examples of such substituted styrenes include para-chlorostyrene, para-ethyl styrene, o-phenylstyrene, p-methoxystyrene, m-nitrostyrene, alpha-methyl-styrene, and the like. In most instances, however, it is preferred to use styrene itself by reason of its low cost.

The reaction of phosphorus pentoxide with a hydrocarbon substituted phenol and the copolymer of allyl alcohol and a styrene is carried out simply by mixing the specified reactants, preferably with a solvent, and heating the resulting solution at a temperature within the range of from about 75° C. to 150° C. until the reaction is complete. The earliest stages of the overall reaction produce a cloudy, thickened reaction mixture but as reaction proceeds further, this is changed to a relatively clear, non-viscous solution. The solvent may be removed, if desired, but generally the above solution is incorporated into the compositions of this invention with the solvent.

The mixture of (I) (A) colloidal disperse system and (I) (B) acidic ester is prepared by the general method described in U.S. Pat. No. 3,453,124 which is incorporated by reference for its disclosure in this regard.

The mixtures (I) of this invention are obtained by mixing the disperse systems (A) with the acidic esters of phosphoric acids (B). Generally, from 5 to 10 parts by weight of the disperse system (A) is mixed with from about 0.5 to 5 parts by weight of the acidic phosphoric-ester composition (B) including inert solvent therein. The preferred ratio is from about 7 parts by weight of the grease composition (A) to 1 part by weight of the acidic phosphoric-ester composition (B) including inert solvent therein. Mixing is effected simply by combining the two reactants at a temperature between about 25° C. and 100° C. although in some instances, the temperature may be 150° C. or higher. Combining is preferably carried out in the presence of a hydrocarbon or halo hydrocarbon solvent which facilitates temperature control and mixing of the reactants. Examples of such solvents include the alkanes having from five to fifteen carbon atoms, the aromatic hydrocarbons having from six to thirty carbon atoms, the various petroleum distillates and the halo and polyhalo hydrocarbons having from two to twenty carbon atoms. More specifically, examples of such solvents include n-hexane, n-pentane, isooctane, dodecane, benzene, xylene, aromatic petroleum spirits, mineral spirits, turpentine, 1,1,1-trichloroethane, 1,1-dichlorobutane, 1,4-dichlorobutane, 1-chlorohexane, and chlorocyclohexane. In general, the grease composition is dispersed in the solvent (at the reflux temperature if necessary), and the acidic phosphorus-containing composition is then added to the solution.

It is not known whether the colloidal system (A) chemically reacts with the acidic ester (B). The exact extent and nature of reaction, if any, is not presently known and need not be known for successful practice of the invention.

The hydrocarbon polymers used in the compositions of this invention are generally solid at room temperature. They are, however, relatively low melting and usually have a melting point below about 80° C.., as determined by ASTM test method D-127. They generally have good organic solvent solubility but they do not substantially dissolve in the mixture of non-Newtonian colloidal disperse system and acidic ester of phosphoric acid at room temperature. This permits them to provide improved film properties after volatile solvent release. Generally, these hydrocarbon polymers have a density of at least 0.910 as measured by ASTM Method D-1168. A particularly useful type of hydrocarbon resin for preparing the compositions of this invention is an ethylene derived hydrocarbon polymer sold by the Bareco Division of the Petrolite Corporation under the name of Vybar Polymers. Among the Vybar Polymers which are useful are Vybar 103 and Vybar 309. The compositions in this invention are usually prepared by (1) forming the mixture of non-Newtonian colloidal disperse system and acidic phosphorus acid ester and then adding thereto the hydrocarbon polymer and often inert additional solvents such as Stoddard solvent and mixing and/or heating the mixture to temperatures as high as 250° C. to form a homogeneous system. The system is then cooled. When used to coat metal surfaces the solvent is allowed to evaporate whereby a coherent, adherent, nonbrittle, corrosion protecting preventing film is formed.

The following are specific examples of the coating compositions of the present invention. All parts and percentages are by weight unless explicitly stated to the contrary. Similarly temperatures are all in degrees centrigrade.

EXAMPLE 1

An acidic ester of a phosphoric acid is prepared as follows: A polyisobutene-substitued phenol is prepared by mixing 940 parts of phenol and 2200 parts of polyisobutene having a molceular weight of 350 at 50°–55° C. in the presence of 30 parts of boron trifluoride, and distilling off the unused phenol and other volatile substances by heating the alkylated phenol to 220° C./12 mm. The resulting alkylated phenol has a hydroxyl content of 3.7%.

A mixture of 1089 parts of xylene and 524 parts of the above prepared polyisobutene-substituted phenol is heated to 50° C. whereupon 523 parts of 1:1 (molar) copolymer of allyl alcohol and styrene having an average molecular weight of 1100 is added over a period of 20 minutes at 50° C. Solution was complete after 1 hour at this temperature. Phosphoric anhydride (52 parts) is added over a period of 15 minutes at 50° C. and the mixture is heated to the boiling point and to 145° C. in 1.2 hours. The mixture is stirred and maintained at this temperature while removing a water-xylene azeotrope over a period of 6 hours. The residue is cooled to 40° C. The residue, a 50% solution in xylene, has a phosphorus content of 1.03% and a neutralization number (bromophenol blue) of 20 acid.

EXAMPLE 2

Following the procedure of Example 1, to a mixture of 1000 parts of aromatic hydrocarbon solvent and 595 parts of the polyisobutene-substituted phenol is added 357 parts of a styrene/allyl alcohol resin having a hydroxyl content of about 5.7 and an average molecular weight of 1600 and phosphoric anhydride (47.6 parts) is added and the reaction mixture is heated at 145° C. with nitrogen blowing. The product, a 50% solution in aromatic solvent, has a phosphorus content of 1.05% and a neutralization number of 16 acid.

EXAMPLE 3A

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

EXAMPLE 3B

Mineral oil (2250 parts), 960 parts (5 moles) of heptylphenol, and 50 parts of water are introduced into a reaction vessel and stirred at 25° C. The mixture is heated to 40° C. and 7 parts of calcium hydroxide and 231 parts (7 moles) of 91 percent assay paraformaldehyde is added over a period of 1 hour. The whole is heated to 80° C. and 200 additional parts of calcium hydroxide (making a total of 207 parts or 5 moles) is added over a period of 1 hour at 80°–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered for purposes of purification. The filtrate, a 33.6 percent oil solution of the desired calcium phenate of heptylphenol-formaldehyde condensation product, is found to contain 7.56 percent sulfate ash.

EXAMPLE 3C

One thousand parts of the carbonated calcium sulfonate complex of Example 3A, 75 parts of the calcium phenate of Example 3B and 325 parts of mineral oil are mixed together. Then, at 60° C. are added, 17 parts methanol, 114 parts butanol and a solution of 1.6 parts $CaCl_2$ in 2 parts of water. To this mixture is added a total of 667 parts lime in six increments at 50° C. with carbonation after each increment until a final base number of 50–60 is obtained. The product is nitrogen blown at 150° C. to remove water, 280 g additional oil is added, mixed, then filtered. The filtrate has a calcium sulfate ash content of 50 percent and a base number of 400.

EXAMPLE 4

To a mixture of 5000 parts of the dispersed system described in Example 3C and 1665 parts of Rule 66

Stoddard solvent, at 50°–55° C. is added carbon dioxide at the rate of 2.0 SCFH for 20 minutes. The carbonated mixture is then heated to 66° C. and a mixture of 284 parts methanol and 216 parts of water is added over a 10 minute period. The mixture is refluxed for 1.5 hours at which point it is and very viscous. An additional 500 parts of Stoddard solvent is added and the mixture is stripped under nitrogen to remove the aqueous alcohol. The mixture is heated 1.5 hours at 160° C. under nitrogen. Then additional 1366 parts of Stoddard solvent is added and the mixture is heated to 110° C. The material described in Example 1 (655 parts) 50% active in a hydrocarbon solvent is slowly added to the stirred mixture and stirring is continued; the mixture is allowed to cool. The resulting product is the desired mixture of colloidal dispersion and acidic phosphoric acid ester.

EXAMPLE 5

To 2850 parts of the mixture described in Example 4 is added 150 parts of an ethylene derived polymer sold under the name Vybar 103. The polymer is cut in small pieces. This mixture is stirred for two hours while being heated to a temperature between 115° to 135° C. The cooled mixture is then diluted with Stoddard solvent to form the desired coating composition.

What is claimed is:

1. A coating composition for protecting metal from corrosion comprising
(I) a mixture made by the process which comprises mixing at a temperature within the range of from about 25° C. up to the decomposition temperature of (A) or (B):
  (A) from about 5 to about 10 parts by weight of a non-Newtonian colloidal disperse system comprising
    (1) solid, metal-containing colloidal particles selected from the class consisting of alkali and alkaline earth metal carbonate predispersed in
    (2) a dispersing medium, and,
    (3) as an essential third component, at least one organic compound which is soluble in said disperse medium, consisting of an alkaline earth metal salt of an acid selected from the class consisting of oil-soluble carboxylic and sulfonic acids; said colloidal particles (1) and said third component (3) in combination constituting from 10% to about 70% by weight of said disperse system (A); with
  (B) from about 0.5 to about 5 parts by weight of an acidic ester of a phosphoric acid, the alcoholic portions of said acidic ester being selected from the class consisting of hydrocarbyloxy and hydroxy-substituted hydrocarbyloxy compounds;
and
(II) an ethylene-derived polymeric resin having a melting point by the ASTM D-127 method of at least about 60° C., said resin being substantially insoluble in said mixture (I) at temperatures below about 60° C.

2. A composition according to claim 1 wherein
(I) the dispersing medium is an inert organic liquid, the essential third component is an alkaline earth metal salt of a sulfonic acid soluble in said liquid, and the alcoholic portions of said acidic ester are selected from the class consisting of aliphatic hydrocarbon-substituted aryloxy, aliphatic hydrocarbyloxy, hydroxy-substituted aliphatic hydrocarbyloxy, and oxy radicals of co-polymers of allyl alcohols and styrene.

3. A composition according to claim 1 wherein
(I) the dispersing medium is an inert organic liquid, at least a portion being mineral oil, the essential third component is an oil-soluble alkaline earth metal salt selected from calcium and barium salts of oil-soluble sulfonic acids and the alcoholic portions of said acidic ester are selected from the class consisting of aliphatic hydrocarbon substituted-phenoxy radicals and oxy radicals of a copolymer of allyl alcohol and a styrene and
(II) the resin has a density of at least about 0.910 gram/cc at 24° C. as determined by ASTM method D-1168.

4. A composition according to claim 1 wherein
(I) the sulfonic acids are petrosulfonic acids.

5. A composition according to claim 1 wherein
(I) the sulfonic acids are synthetic sulfonic acids.

6. A composition according to claim 5 wherein the sulfonic acid is at least one polypropylene-substituted benzene sulfonic acid of molecular weight 500–700.

7. A maintenance paint for metals comprising a composition according to claim 1, 2, 3, 4, 5 or 6 and a substantially inert, volatile diluent.

8. A composition as claimed in claim 1 where there are (I) (A) about 25 to about 75 parts non-Newtonian colloidal disperse system, (I) (B) about 3 to about 10 parts acidic ester and (II) about 3 to about 10 parts resin.

9. A metal article of manufacture at least a part of whose surface is coated with the composition of claim 1, 2, 3, 4, 5 or 6.

* * * * *